United States Patent [19]
Kondo

[11] Patent Number: 6,164,860
[45] Date of Patent: Dec. 26, 2000

[54] JOINT ASSEMBLY FOR CAR STEERING SYSTEMS

[75] Inventor: Yasuhiro Kondo, Aichi-ken, Japan

[73] Assignee: Musashi Seimitsu Kogyo Kabushiki Kaisha, Aichi-Ken, Japan

[21] Appl. No.: 09/318,194

[22] Filed: May 25, 1999

[30] Foreign Application Priority Data

May 28, 1998 [JP] Japan .................................. 10-146755

[51] Int. Cl.[7] ..................................................... F16C 11/06
[52] U.S. Cl. ........................... 403/132; 403/56; 403/122; 280/93.51
[58] Field of Search ................................... 403/122, 132, 403/135, 128, 131, 133, 130, 140, 56, 76, 225; 280/674, 93.509, 93.508, 93.511, 93.51; 180/258, 440

[56] References Cited

U.S. PATENT DOCUMENTS

| | | | |
|---|---|---|---|
| 2,757,015 | 7/1956 | Latzen | 403/56 X |
| 2,771,300 | 11/1956 | Latzen | 403/133 X |
| 3,061,329 | 10/1962 | Hintzen | 403/140 X |
| 4,092,078 | 5/1978 | Klotz et al. | 403/133 X |
| 5,529,316 | 6/1996 | Mattila | 280/93.51 |
| 6,076,840 | 6/2000 | Kincaid et al. | 403/122 X |

*Primary Examiner*—Harry C. Kim
*Attorney, Agent, or Firm*—Ladas & Parry

[57] ABSTRACT

The joint assembly 1 for a car steering system has a first ball joint 11, a tubular collar 25, an elastic member 26 and a second ball joint 21. The first ball joint 11 has a stem 13 provided with a recess 13a. The tubular collar 25 has a protrusion 25a at an inside thereof and provided around the stem 13 in such a manner that the protrusion 25a confronts the recess 13a. The elastic member 26 is provided between the recess 13a of the stem 13 and the protrusion 25a of the collar 25. The second ball joint 21 has a hole 19 for accommodating the collar 25 covering the stem 13. According to the joint assembly 1, vibration generated at the wheel 71 is absorbed by the elastic member 26 and seldom gives the driver uncomfortableness or causes the driver to err in driving the car.

7 Claims, 7 Drawing Sheets

JOINT ASSEMBLY FOR CAR STEERING SYSTEMS

BACKGROUND OF THE INVENTION

1. Field of the Invention

This invention relates to a joint assembly for a steering system of a car or the like.

2. Disclosure of the Related Art

Figure 8:
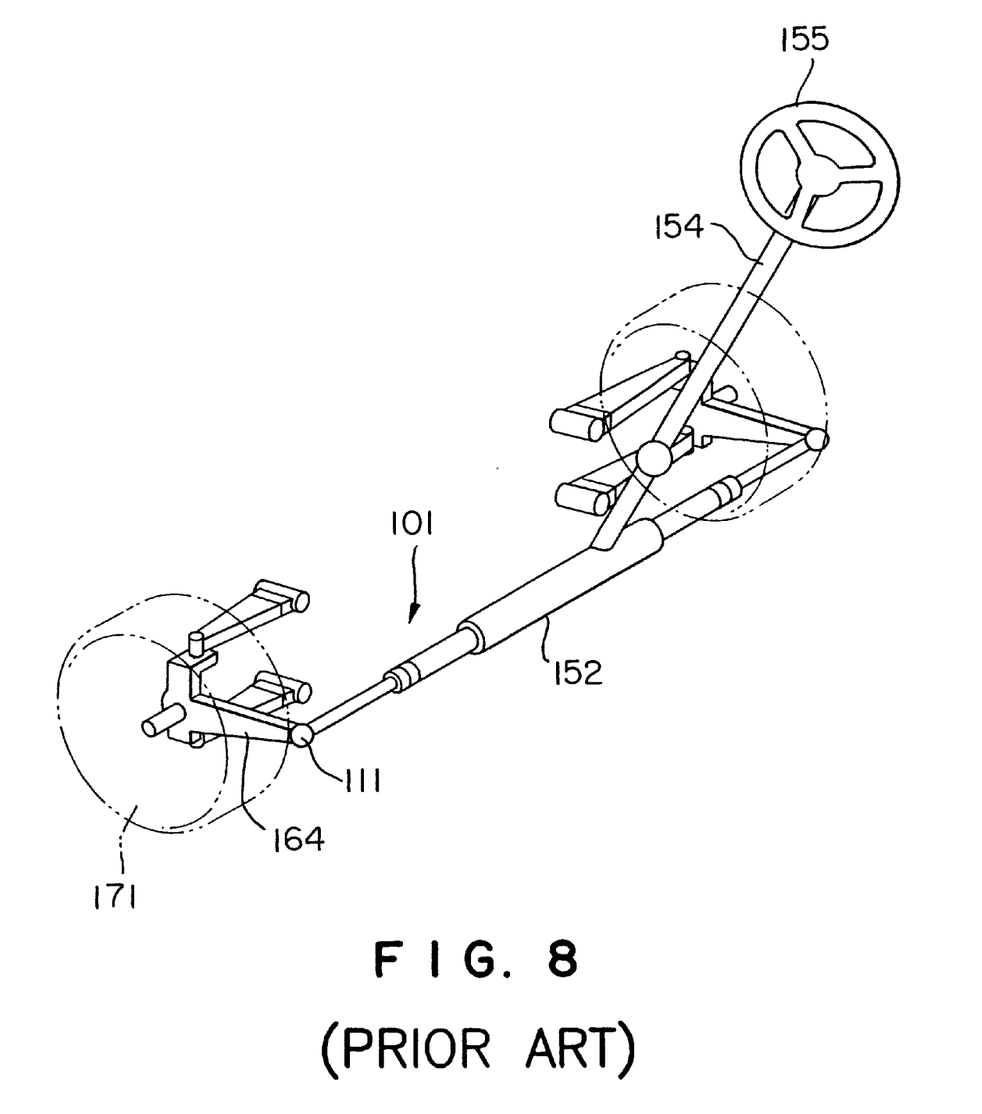
FIG. 8 is a schematic view of a steering mechanism including a conventional joint assembly.

There are various types of car steering system. For example, the rack-pinion type of car steering system has a structure described below. As shown in FIG. 8, a wheel support member 164 which supports a wheel 171 is connected with a rack bar (not shown) of a rack assembly 152 via a joint assembly 101 having a first ball joint 111. The rack teeth on the rack bar engage with a steering gear (not shown) arranged at the end portion of a steering shaft 154 extending from the steering wheel 155. According to this structure, rotational movement produced by rotating the steering wheel 155 is converted into linear movement in the car-width direction by the steering gear and the rack teeth, so that the wheel support member 164 is pulled or pushed to change the direction of the wheel 171.

Figure 9:
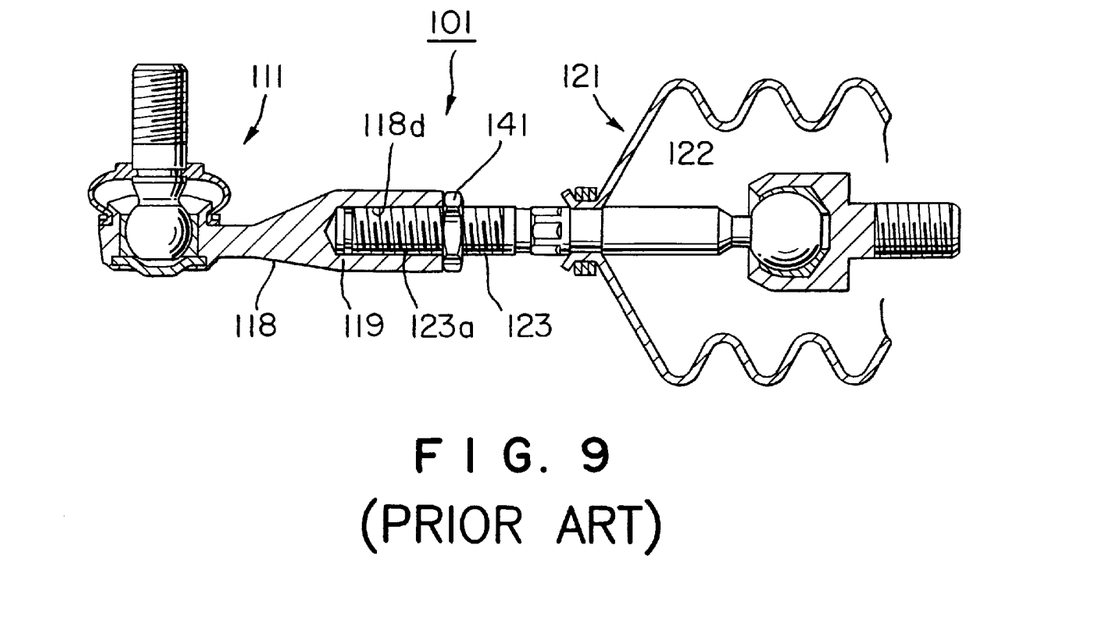
FIG. 9 is a schematic partial sectional view of the conventional joint assembly.

AS shown in FIG. 9, a joint assembly 101, which joins the wheel support member 164 to the bar of the rack in the above structure, consists of a first ball joint 111 and a second ball joint 121. The first ball joint 111 has a housing 118 which is provided with a cylindrical threaded hole 119 at the end portion near the second ball joint. The second ball joint 121 has a ball stud 122 which is provided with a threaded stem 123. A male screw 123a of the threaded stem 123 and a female screw 118d of the cylindrical threaded hole 119 are engaged with each other, and are locked with a nut 141.

Vibration generated at the wheel 171 is transmitted to the joint assembly 101 via the wheel support member 164 when the wheel 171 rides over protrusions on the road while the car is moving or when the car suddenly starts or stops. The vibration can moreover be transmitted to the steering wheel 155 which the driver directly manipulates. Therefore, the vibration gives uncomfortableness to the driver or causes the driver to err in driving the car.

SUMMARY OF THE INVENTION

It is an object of the present invention to solve those problems and to provide a joint assembly for car steering systems which can suppress the transmission of vibration from the wheel to the steering wheel.

According to the present invention, a joint assembly comprises: a ball joint having a stem provided with a recess; a tubular collar having a protrusion at an inside thereof and provided around the stem in such a manner that the protrusion confronts the recess; an elastic member filled between and secured to the recess of the stem and the protrusion of the collar; and another ball joint having a hole for accommodating the collar covering the stem.

According to the feature, vibration generated at the wheel is absorbed by the elastic member and seldom gives uncomfortableness to the driver or causes the driver to err in driving the car.

The recess is preferably circumferentially formed on an outside of the stem. The protrusion is also preferably circumferentially formed on an inside of the collar.

An outside diameter of the stem is preferably larger than an inside diameter of the protrusion of the collar. In the case, withdrawal of the stem 23 is surely prevented.

The hole is preferably provided with a restraining portion for restraining the collar. In the case, the protrusion of the collar is prevented from being forcibly enlarged by shift of the stem along the axis thereof.

According to the present invention, another joint assembly comprises: a joint assembly comprising: a ball joint having a stem provided with a plurality of recesses; a tubular collar having a plurality of protrusions at an inside thereof and provided around the stem in such a manner that the protrusions confront the recesses; an elastic member filled between and secured to the recesses of the stem and the protrusions of the collar; and another ball joint having a hole for accommodating the collar covering the stem.

DESCRIPTION OF THE PREFERRED EMBODIMENTS

Preferred embodiments of the present invention will now be described in detail with reference to the accompanying drawings.

Figure 1:
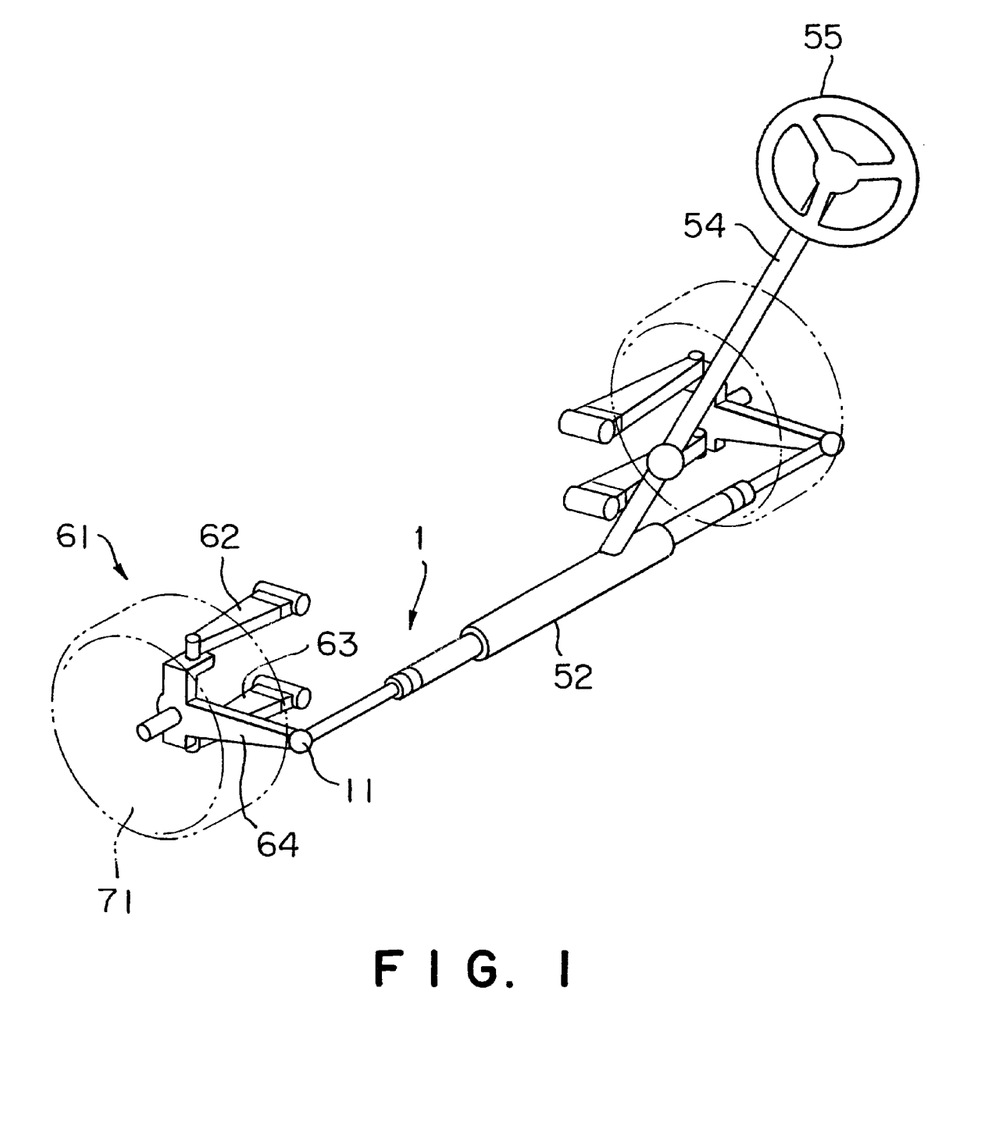
FIG. 1 is a schematic view of a steering mechanism including a joint assembly in a first embodiment of the invention.

FIG. 1 shows a joint assembly 1 of a car steering system and its associated units. A suspension unit 61 has; a wheel support member 64 which supports a wheel 71, and an upper arm 62 and a lower arm 63 which connect and support the wheel support member 64 and the body of the car. The wheel support member 64 is connected with a rack bar (not shown) of a rack assembly 52 via the joint assembly 1 comprising a first ball joint 11. Rack teeth on the rack bar engage with a steering gear (not shown) arranged at an end portion of a steering shaft 54 extending from a steering wheel 55. Rotational movement produced by rotating the steering wheel 55 is converted into linear movement in the car-width direction by the steering gear and the rack teeth, so that the wheel support member 64 is pulled or pushed to change the direction of the wheel 71.

Figure 2:
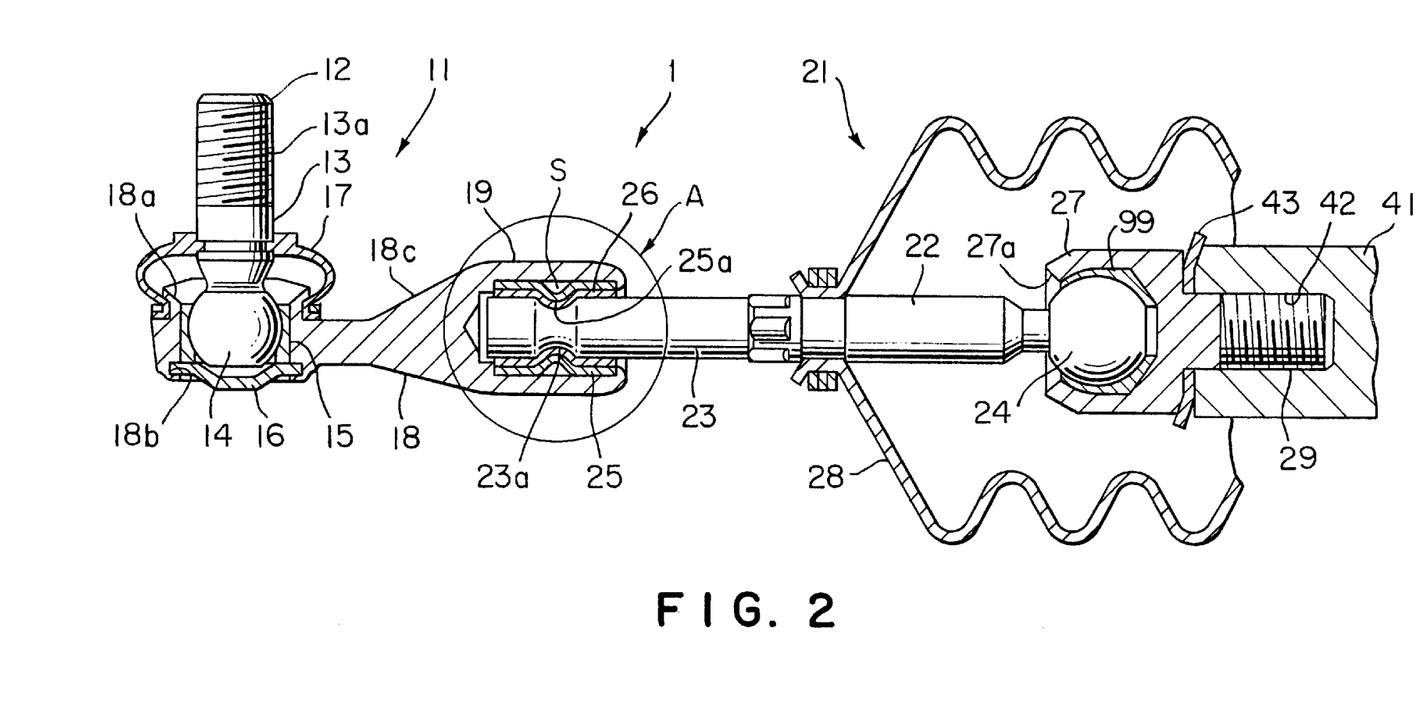
FIG. 2 is a schematic partial sectional view of the joint assembly in FIG. 1.

As shown in FIG. 2, the joint assembly 1, which is used in the steering mechanism, comprises a first ball joint 11 and a second ball joint 21.

The first ball joint 11 comprises a ball stud 12, which has a spherical head 14 and a stem 13 extending from the spherical head 14 and having a threaded portion 13a on the side opposite to the spherical head 14. The spherical head 14 of the ball stud 12 is held by a bearing 15 made of a synthetic resin. The bearing 15 is held by a housing 18 which has a smaller opening 18a, a larger opening 18b and a shank 18c extending therefrom. The stem 13 of the ball stud 12 protrudes through the smaller opening 18a. A closure disk 16 is fitted and secured to the inside circumference of the larger opening 18b by plastic deformation. The shank 18c of the housing 18 extends perpendicularly to the axis of the ball stud 12 and is provided with a cylindrical hole 19 at the terminal portion thereof. A boot 17 made of an elastic material is fitted in the region from an outer circumference of the stem 13 of the ball stud 12 to the outer circumference of the smaller opening 18a of the housing 18.

Figure 3A:
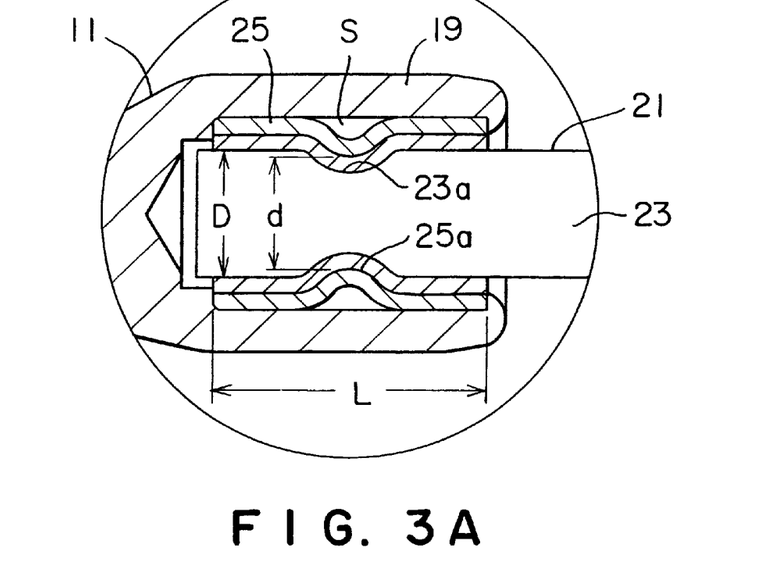
FIG. 3A is an enlarged view of the "A" section of FIG. 2 in a normal state.

The second ball joint 21 comprises a ball stud 22, which has a spherical head 24 and a stem 23 extending from the spherical head 24 and having a diameter smaller than the inside diameter of the cylindrical hole 19 of the first ball joint 11. The stem 23 of the ball stud 22 is provided with a circumferential or annular recess 23a near the end portion on the side of the first balljoint. A tubular collar 25 is arranged around the end portion on the side of the first joint, concentrically with the stem 23. The collar 25 is provided with an annular protrusion 25a, which extends circumferentially of the coller 25 and protrudes toward the center axis, at a location facing or confronting the recess 23a of the stem 23. The protrusion 25a is formed by radially inwardly deforming an annular wall portion of the collar 25. An elastic member 26 is provided in the gap between the collar 25 and the stem 23. As shown in FIG. 3A, the outside diameter D of the stem 23 in the region without the recess 23a is larger than the inside diameter d of the protrusion 25a of the collar 25 in this case. A circumferential gap S is formed between the recessed outside wall of the protrusion 25a of the collar 25 and the cylindrical hole 19.

As shown in FIG. 2, the spherical head 24 of the second ball joint 21 is held by a bearing 99 made of a synthetic resin. The bearing 99 is held by a housing 27 having an opening 27a. The stem 23 of the ball stud 22 protrudes through the opening 27a. The housing 27 is provided with a male threaded portion 29 on the side opposite to the opening 27a. The male threaded portion 29 engages with a female threaded portion 42 of a shifting bar 41 (for example, a rack bar) via a washer 43 for preventing undesirable rotation. A boot 28 made of an elastic material is provided to cover an area from an outside circumference of the stem 23 of the ball stud 22 to the outside circumference of a shifting bar case (not shown).

Manufacturing steps of the jointing portion "A" of the first ball joint 11 and the second ball joint 21 will be described below, with reference to FIGS. 4A to 6.

Figure 4A:
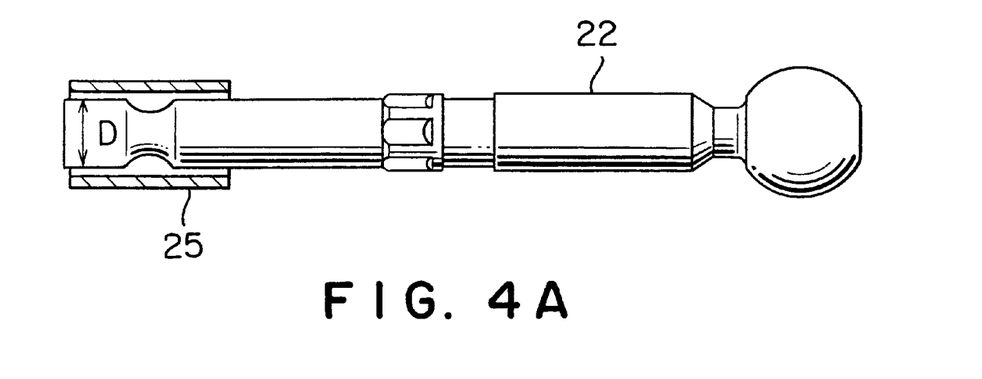
FIGS. 4A to 4C are explanatory views of manufacturing steps for a bush assembly.
Figure 4B:
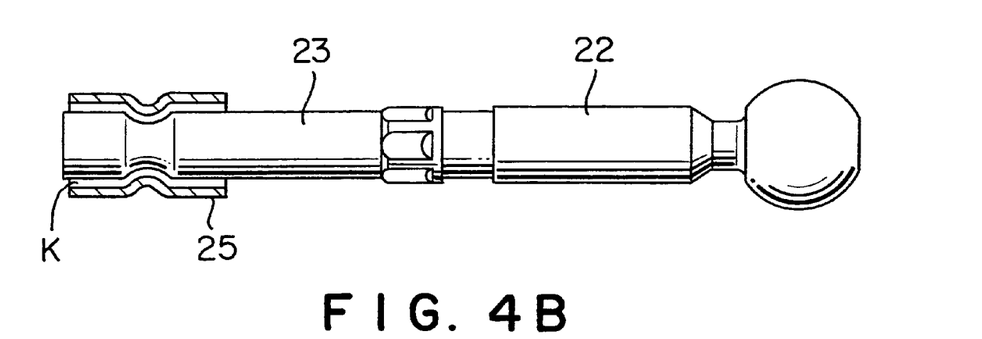
Figure 5A:
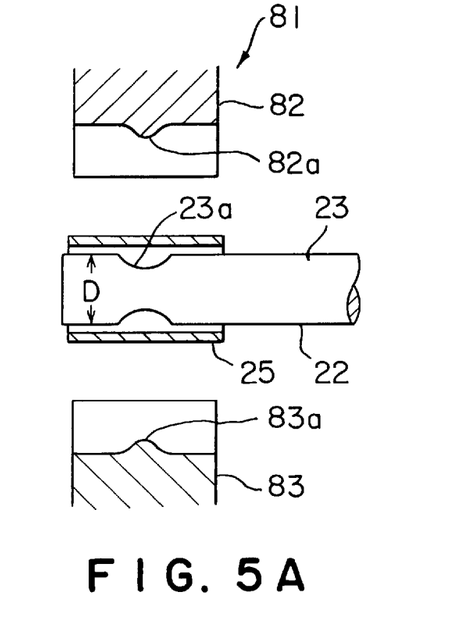
FIGS. 5A and 5B are explanatory views of a first manufacturing step for the bush assembly.
Figure 5B:
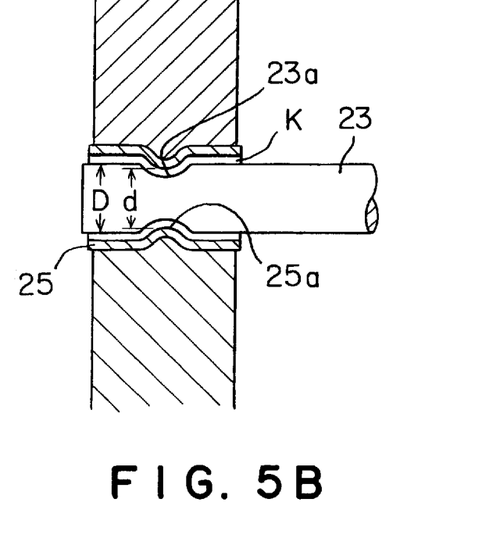

As shown in FIG. 4A, there are prepared the ball stud 22, and the cylindrical collar 25 which has the inside diameter larger than the outside diameter D of the stem 23 of the ball stud 22 at the end portion on the side of the first ball joint 11. The collar 25 extends straight along the center axis thereof. As shown in FIG. 5A, the collar 25 is arranged around the end portion of the stem 23 of the ball stud 22, concentrically with the stem 23. The ball stud 22 and the collar 25 are supported by a support jig (not shown) in the relative position shown. As shown in FIG. 5B, the collar 25 is press-formed between an upper mold 82 and an lower mold 83 which have semi-annular shaping protrusions 82a and 83a at portions corresponding to halves of the recess 23a of the ball stud 22, respectively, in such a manner that the space K between the collar 25 and the stem 23 has a substantially even thickness. That is, this press-forming operation deforms the collar 25 to form the annular protrusion 25a. In this case, the protrusion 25a is formed in such a manner that an inside diameter d thereof is smaller than the outside diameter D of the stem 23.

Figure 4C:
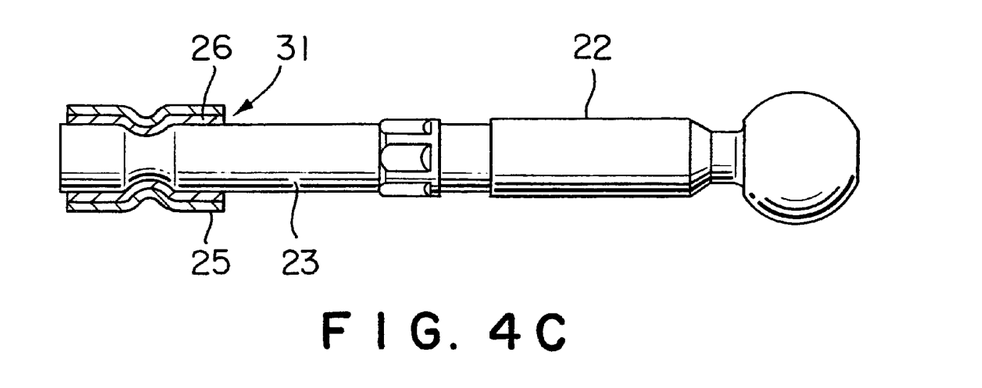
Figure 6:
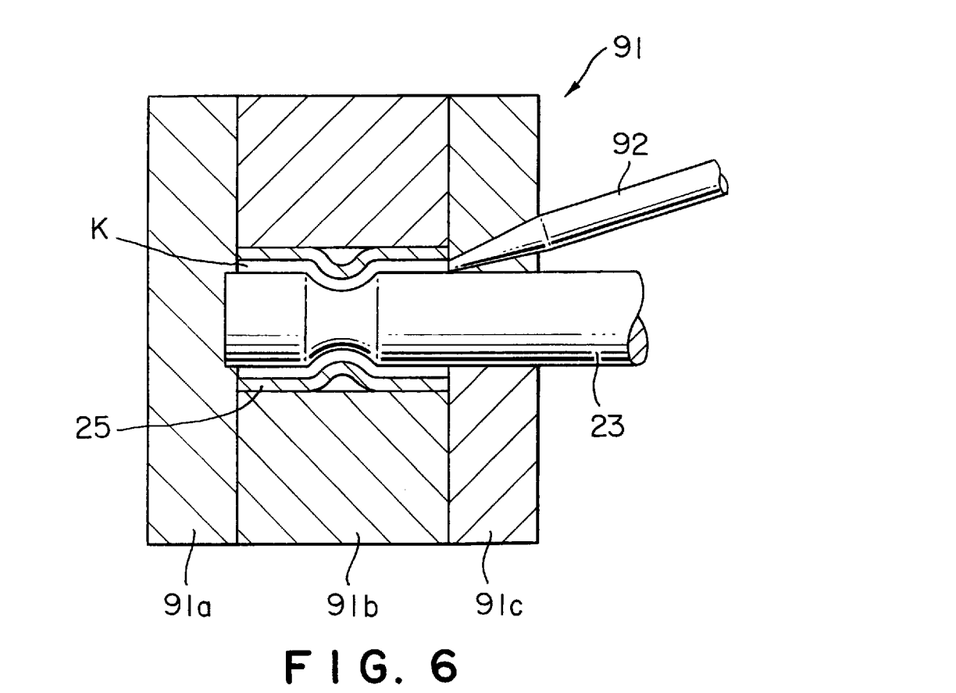
FIG. 6 is an explanatory view of a second manufacturing step for the bush assembly.

Then, as shown in FIG. 6, the collar 25 and the ball stud 22 are arranged in a shaping mold 91 in such a manner that the space K between the stem 23 and the collar 25 has a substantially even thickness. That is, molds 91a and 91c holding the stem 23 and a mold 91b holding the collar 25 are positioned in such a manner that the space K has a substantially even thickness. Then, an elastic material is introduced into the space K by a supply means 92 to form the elastic member 26. As a result, a bush assembly 31 is completed as shown in FIG. 4C.

The bush assembly 31 provided on the second ball joint 21 is pressed and introduced into the cylindrical hole 19 of the first ball joint 11, and is fixed thereinto by plastic deformation.

As shown in FIG. 1, the joint assembly 1 of this embodiment is used in such a manner that the first ball joint 11 is connected with the wheel support member 64 supporting the wheel 71 and the second ball joint 21 is connected with the rack bar (not shown) of the rack assembly 52. Therefore, vibration generated at the wheel 71 is effectively absorbed by the elastic member 26 and is not transmitted to the steering wheel 55 connected with the rack bar. Thus, vibration seldom gives the driver uncomfortableness or causes the driver to err in driving the car.

Figure 3B:
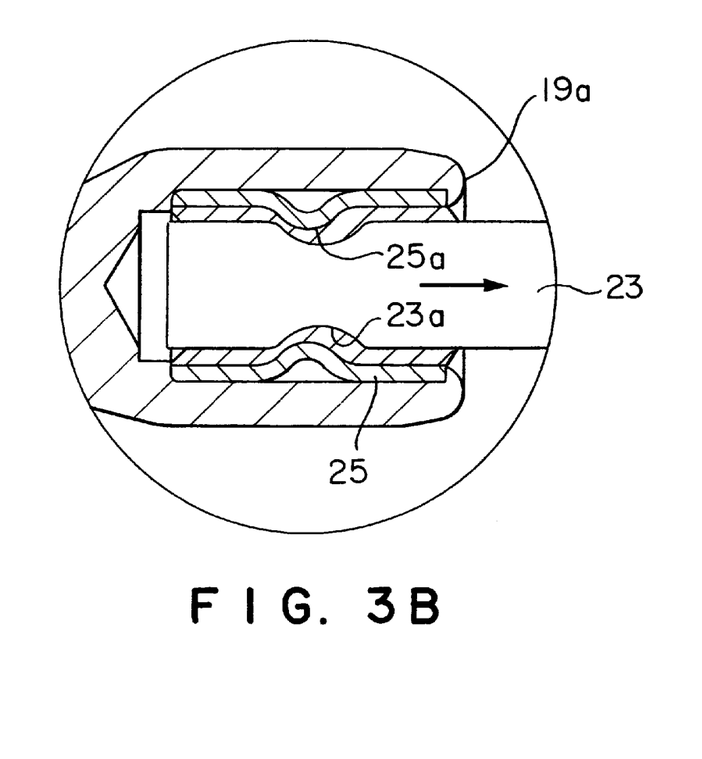
FIG. 3B is an enlarged view of the "A" section of FIG. 2 in a state in which the stem is pulled.

As shown in FIG. 3B, shifting movement of the first ball joint 11 and the second ball joint 21 along the axis thereof is restricted within a deformable range of the elastic member 26 between the protrusion 25a of the collar 25 and the recess 23a of the stem 23. Thus, a "play-less" sensation is achieved in the directional manipulation of the wheel 71 by rotating the steering wheel 55. In addition, removal of the stem 23 out of the hole 19 is surely prevented.

Furthermore, a restraining portion 19a is formed at the end portion of the cylindrical hole 19 on the side of the second ball joint 21 by plastic deformation in the embodiment. Thus, both ends of the collar 25 are restrained by the bottom surface of the cylindrical hole 19 and the restraining portion 19a, respectively. Therefore, the protrusion 25a of the collar 25 is prevented from being forcibly enlarged by shift of the stem 23 along the axis thereof.

Figure 7:
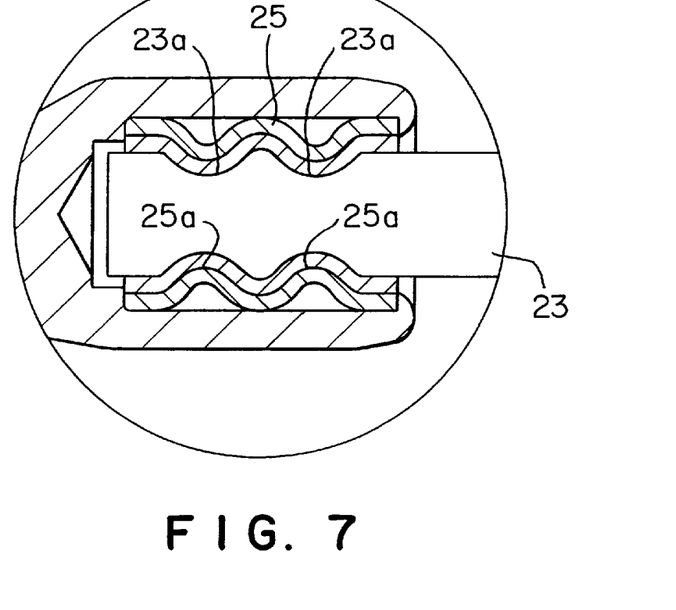
FIG. 7 is a partial sectional view of the joint assembly in a second embodiment of the invention.

The joint assembly 1 in the above embodiment is provided with one recess 23a of the stem 23 and one protrusion 25a of the collar 25, but could be provided with a plurality of recesses and a plurality of protrusions arranged along the longitudinal direction of the stem 23 as shown in FIG. 7.

What is claimed is:

1. A joint assembly comprising:
   a ball joint having a stem provided with a recess;
   a tubular collar having a protrusion at an inside thereof and provided around the stem in such a manner that the protrusion confronts the recess;
   an elastic member filled between and secured to the recess of the stem and the protrusion of the collar; and
   another ball joint having a hole for accommodating the collar covering the stem.

2. A joint assembly according to claim 1, wherein the recess is circumferentially formed on an outside of the stem.

3. A joint assembly according to claim 1, wherein the protrusion is circumferentially located on the inside of the collar.

4. A joint assembly according to claim 1, wherein an outside diameter of the stem is larger than an inside diameter of the protrusion of the collar.

5. A joint assembly according to claim 1, wherein the hole is provided with a restraining portion for restraining the collar.

6. A joint assembly according to claim 1, wherein the joint assembly is adapted to connect a shifting bar shiftable in a car-width direction and a wheel support member supporting a wheel.

7. A joint assembly comprising:
- a ball joint having a stem provided with a plurality of recesses;
- a tubular collar having a plurality of protrusions at an inside thereof and provided around the stem in such a manner that the protrusions confront the recesses;
- an elastic member filled between and secured to the recesses of the stem and the protrusions of the collar; and
- another ball joint having a hole for accommodating the collar covering the stem.

* * * * *